US012706845B2

(12) United States Patent
Zuniga et al.

(10) Patent No.: US 12,706,845 B2
(45) Date of Patent: Aug. 11, 2026

(54) LOW LATENCY, LOW LOSS, SCALABLE THROUGHPUT LATENCY IMPROVEMENT

(71) Applicant: Cisco Technology, Inc., San Jose, CA (US)

(72) Inventors: Juan Carlos Zuniga, Montreal (CA); Robert E. Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 18/786,311

(22) Filed: Jul. 26, 2024

(65) Prior Publication Data

US 2025/0158926 A1 May 15, 2025

Related U.S. Application Data

(60) Provisional application No. 63/598,932, filed on Nov. 14, 2023.

(51) Int. Cl.
*H04L 47/11* (2022.01)
*H04L 47/12* (2022.01)

(52) U.S. Cl.
CPC .............. *H04L 47/11* (2013.01); *H04L 47/12* (2013.01)

(58) Field of Classification Search
None
See application file for complete search history.

(56) References Cited

U.S. PATENT DOCUMENTS 11,356,380 B1 6/2022 White et al.
2006/0253622 A1* 11/2006 Wiemann .............. H04L 69/163 370/413
2019/0068502 A1* 2/2019 Shiraki ................... H04L 47/12
2021/0083981 A1* 3/2021 Shmilovici ............. H04L 45/74
2021/0344601 A1* 11/2021 Ye ........................... H04L 47/33
2022/0294736 A1* 9/2022 Yan ..................... H04L 43/0882
2022/0368633 A1 11/2022 Liu et al.
2023/0095840 A1 3/2023 Tsiaflakis et al.
2024/0056401 A1 2/2024 Nadas et al.
2024/0106760 A1* 3/2024 Brar ........................ H04L 47/26

(Continued)

FOREIGN PATENT DOCUMENTS

WO 2019207403 A1 10/2019
WO 2023048629 A1 3/2023
WO WO-2023088558 A1 * 5/2023 ............. H04L 47/12

OTHER PUBLICATIONS

DC-ECN: A machine-learning based dynamic threshold control scheme for ECN marking in DCN (Year: 2019).*

(Continued)

*Primary Examiner* — Tonia L Dollinger
*Assistant Examiner* — Ishrat Rashid
(74) *Attorney, Agent, or Firm* — Merchant & Gould P.C.

(57) ABSTRACT

Low Latency, Low Loss, Scalable Throughput (L4S) latency improvements may be provided. Improving L4S can include determining traffic in a L4S queue has crossed above a first threshold. In response to determining the traffic in the L4S queue has crossed above the first threshold, a priority of the L4S queue is increased. When it is determined the traffic in the L4S queue has crossed above a second threshold, a congestion notification is sent.

20 Claims, 7 Drawing Sheets

(56) References Cited

U.S. PATENT DOCUMENTS

2026/0005973 A1* 1/2026 Haddad .................. H04L 47/31

OTHER PUBLICATIONS

Fair Access Provisioning through Contention Parameter Adaptation in the IEEE 802.11e Infrastructure Basic Service Set (Year: 2008).*

International Search Report and Written Opinion for International Application No. PCT/US2024/055951, mailed Feb. 18, 2025, 19 Pages.

Keceli F., et al., "Fair Access Provisioning through Contention Parameter Adaptation in the IEEE 802.11e Infrastructure Basic Service Set", arXiv:0806.1093v1 [cs.Nl], arxiv.org, Cornell University Library, 201 Olin Library Cornell University Ithaca, NY 14853, Jun. 6, 2008, pp. 17-19, XP080421530, 78 Pages.

Majidi A., et al., "DC-ECN: A Machine-learning based Dynamic Threshold Control Scheme for ECN Marking in DCN", Computer Communications, Elsevier Science Publishers BV, Amsterdam, NL, vol. 150, Nov. 11, 2019, pp. 334-345, XP086011256, ISSN: 0140-3664, DOI: 10.1016/J.COMCOM.2019.10.028, paragraphs [001.], [04.4], figure 2, paragraphs [0006]-[0009], [0018], [0221]-[0023], [0071], [0111].

White G., et al., "End-to-End Congestion Control, L48 and Implications for Wi-Fi", IEEE Draft, 11-23-2065-00-0WNG-L4S-AND-IMPLICATIONS-FOR-WI-FI, IEEE—SA Mentor, Piscataway, NJ USA, vol. 802.11 WNG, Nov. 14, 2023, pp. 1-33, XP068207145, Retrieved from https://mentor.ieee.org/802.11/dcn/23/11-23-2065-00-0wng-I4s-and-implications-for-wi-fi.pptx on Nov. 13, 2023, pp. 22-31.

Brunello Davide, et al. "Low Latency Los Loss Scalable Throughput in 5G Networks" School of Electrical Engineering and Computer Science, KTH Royal Institute of Technology, Stockholm, Sweden; 2021 IEEE 93rd Vehicular Technology Conference (VTC2021—Spring) | 978-1-7281-8964-2/20/$31.00 © 2021 IEEE | DOI: 10.1109/VTC2021-Spring51267.2021.9448764 (7 pages).

* cited by examiner

LOW LATENCY, LOW LOSS, SCALABLE THROUGHPUT LATENCY IMPROVEMENT

RELATED APPLICATION

Under provisions of 35 U.S.C. § 119(e), Applicant claims the benefit of and priority to U.S. Provisional Application No. 63/598,932, filed Nov. 14, 2023, the disclosure of which is incorporated herein by reference in its entirety.

TECHNICAL FIELD

The present disclosure relates generally to providing Low Latency, Low Loss, Scalable Throughput (L4S) latency improvements.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
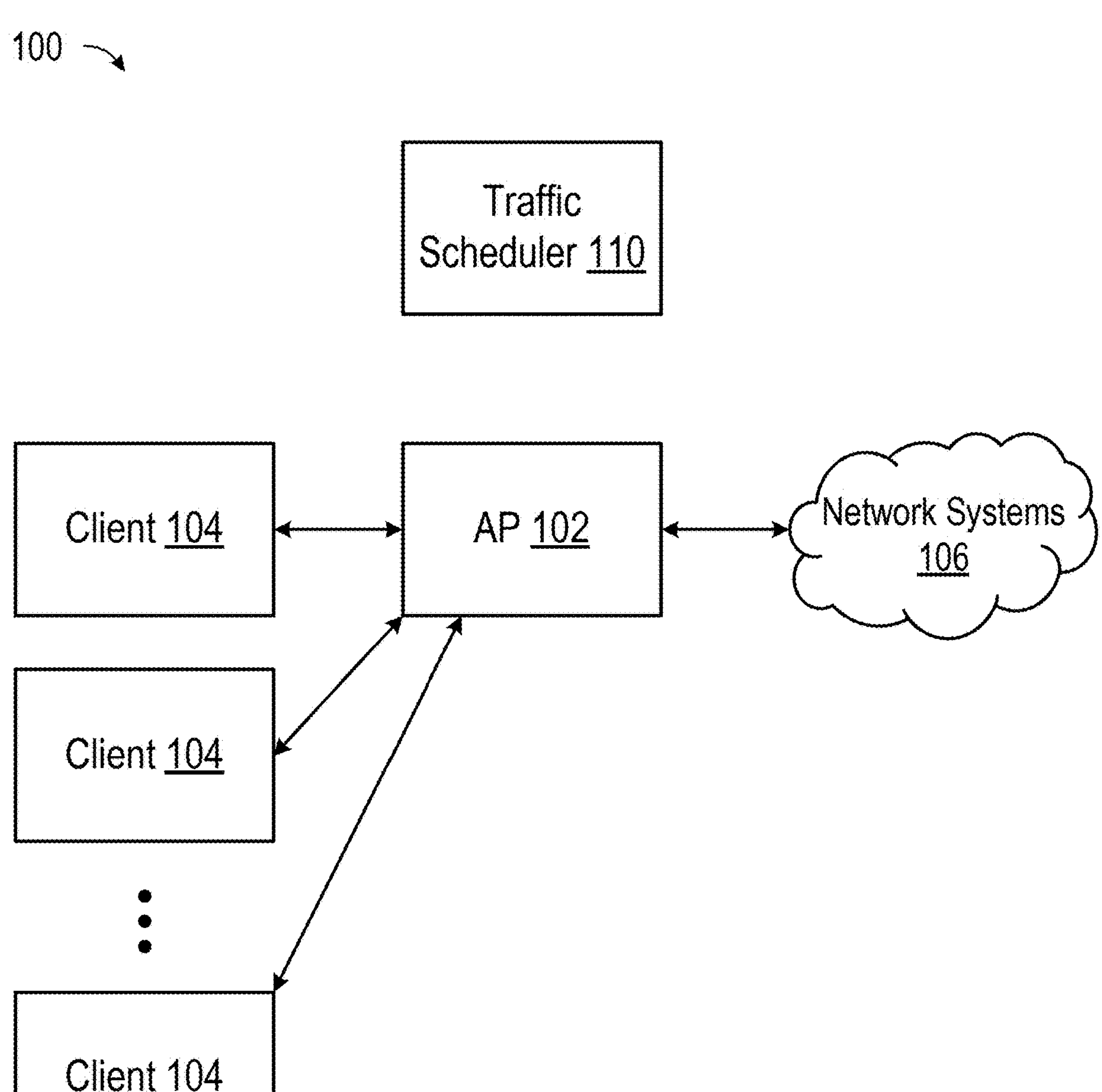
FIG. 1 is a block diagram of an operating environment for Low Latency, Low Loss, Scalable Throughput (L4S) latency improvements in accordance with aspects of the present disclosure.

Low Latency, Low Loss, Scalable Throughput (L4S) latency improvements may be provided. Improving L4S can include determining traffic in a L4S queue has crossed above a first threshold. In response to determining the traffic in the L4S queue has crossed above the first threshold, a priority of the L4S queue is increased. When it is determined the traffic in the L4S queue has crossed above a second threshold, a congestion notification is sent.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Low Latency, Low Loss, Scalable Throughout (L4S) is an architecture and protocol described in the Internet Engineering Task Force (IETF) standards (e.g., the IETF Request for Comment 9330, 9331, 9332). L4S is implemented to provide low queuing latency, low congestion loss, and scalable throughput control for streaming video, multiplayer games, and other real-time applications. By handling data packet processing and reducing network congestion, L4S minimizes delays caused by queue bloat and enables smoother and more efficient data transmission.

Integrating L4S with existing network infrastructures and ensuring compatibility with a wide range of applications can be challenging. For example, L4S may require multiple features compatible with its requirements for integration. The required features can include the existence of a scalable congestion control at a sender host capable of keeping an average time for congestion signals as the flow rate scales, a packet identifier at the Internet Protocol (IP) layer to be used as an explicit congestion control signaling protocol, support for detailed Explicit Congestion Notification (ECN) feedback, the capability to isolate traffic in separate queues so L4S traffic can be kept on a shallow queue, and a conditional priority scheduler that can give preference to L4S traffic over other types of traffic. L4S can have different requirements based on the infrastructure of the network L4S is being implemented in.

L4S has proven to be beneficial, especially for real-time services, as implemented in several network environments.

The positive effects of L4S are attained if L4S is supported for the most critical elements of the network path. The shared medium characteristics of the wireless Wi-Fi channel make this link one of the most critical points in the network path. When congestion is detected on the link (e.g., queue exceeding the shallow threshold), the L4S protocol dictates that a notification, such as an ECN, should be used to notify the traffic source about the congestion. The traffic source may reduce its transmission rate in response to receiving the notification. When the source is on the other side of the path, it may take a whole round-trip-time (RTT) to react to the congestion notification. Thus, the operating improvements L4S can provide may be reduced by the slow reaction time.

L4S notifications are typically issued in a binary state, with the link being either considered acceptable (e.g., no congestion) or not acceptable (e.g., under congestion) in which case the congestion notification, such as an ECN, may be sent to a traffic source. This binary logic works well for wired nodes, where congestion is the result of traffic build-up and is therefore well defined. However, wireless networks (e.g., Wi-Fi networks) may be more random or stochastic. Failure to send a frame within an expected period can be caused by congestion but can also be caused by various sources of interference that can appear and disappear quickly. Thus, the ECN mechanism may not be well adapted to mediums like Wi-Fi. A more flexible L4S scheme is needed for proper integration of L4S into wireless networks, such as the networks described by the Institute of Electrical and Electronics Engineers (IEEE) 802.11 standard and amendments.

FIG. 1 is a block diagram of an operating environment 100 for Low Latency, Low Loss, Scalable Throughput (L4S) latency improvements. The operating environment 100 includes an Access Point (AP) 102, one or more clients 104, network systems 106, and a traffic scheduler 110. The AP 102 may enable devices within range of the AP 102, including the clients 104, to connect to devices and applications of the network, including the network systems 106. Thus, the AP 102 can provide one or more links for the clients 104 to communicate with other devices, including the network systems 106. The clients 104 can be any device (e.g., a smart phone, a tablet, a personal computer, a server, etc.) that connects to the network, such as to communicate with other devices on the network. The network systems 106 may be the Internet and/or other network systems the clients 104 can communicate with via the wireless network.

In the illustrated example, the clients 104 all have a link to the network via the AP 102. However, there may be one or more additional APs 102 that are in parallel or in series between the clients 104 and the network systems 106. There may be a different number of devices in the operating environment 100 in other examples, including APs, STAs, traffic schedulers, controllers, and/or other network devices.

The traffic scheduler 110 can manage the traffic of the devices in the operating environment 100. In some embodiments, the traffic scheduler 110 is a controller (e.g., a Wireless Local Area Network Controller). In other embodiments, the traffic scheduler 110 is a component of the AP 102 and/or other APs of the wireless network. The traffic scheduler 110 can implement an improved L4S intended for wireless networks to provide lower queuing, lower latency, lower congestion loss, and scalable throughput control.

The elements described above of the operating environment 100 (e.g., the AP 102, the AP 102, the clients 104, the network systems 106, the traffic scheduler 110, etc.) may be practiced in hardware, in software (including firmware, resident software, micro-code, etc.), in a combination of hardware and software, or in any other circuits or systems. The elements of the operating environment 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of the operating environment 100 may also be practiced using other technologies capable of performing logical operations such as, for example, AND, OR, and NOT, including but not limited to, mechanical, optical, fluidic, and quantum technologies. As described in greater detail below with respect to FIGS. 6 and 7, the elements of the operating environment 100 may be practiced in a computing device 600 and/or communications device 700.

L4S can be implemented to improve the function of wireless networks, such as the wireless network in the operating environment 100. Wireless network traffic consists of traffic (e.g., packets) sent by clients 104 and network systems 106, such as the Internet. Traffic on the wireless network, including from the clients 104 and the network systems 106 can have irregular traffic rates (i.e., varying amounts of traffic over time, including bursts of high traffic periods). During periods of high traffic, the systems of the wireless network can send more packets than part(s) of the network can accommodate, such as the AP 102, other routers, and the like. When the arrival rate of traffic exceeds the service rate, traffic forms queues and latency and congestion is introduced. For example, a high amount of traffic may be received on a link in a short period, causing congestion until the queues return to their normal states or some network technique or algorithm, such as Weighted Random Early Detection (WRED), reduces the queue. On Wi-Fi links, however, congestion can be caused by collisions (e.g., micro-collisions) or temporal interferences that are not reflective of the overall queue congestion or that may quickly alleviate. Thus, the traffic may be low enough for the network to handle even when there is congestion due to collisions and/or interference.

Current L4S architecture may cause a congestion notification, such as an ECN, to be sent to a traffic source (e.g., a client 104 or one of the network systems 106). When utilizing an ECN, the traffic scheduler 110 and/or the AP 102 may set an ECN mark in traffic (e.g., in a header) to signal the congestion notification. In response to receiving the congestion notification, the traffic source may alter its operation, such as reducing the traffic rate, canceling or pausing queued traffic, and/or the like. Signaling congestion notifications enables devices facilitating traffic management to lower the size of queues or stop queues from filling up without causing excessive packet loss. However, if a congestion notification is sent in response to congestion caused by collisions and/or interference, the network may be able to accommodate the traffic source without needing the traffic source to adjust its operation. Additionally, the congestion from collisions and interference may be short-lived and in some instances too late to alter operation (e.g., the congestion alleviates before the RTT of communicating with the traffic source). The traffic source may therefore have altered its operation in a way that causes reduced performance without needing to. The traffic scheduler 110 can implement an improved L4S to avoid unnecessarily causing traffic sources to alter operation when the traffic source will not be able to adjust operation quickly enough and/or when the traffic load can be handled.

Figure 2:
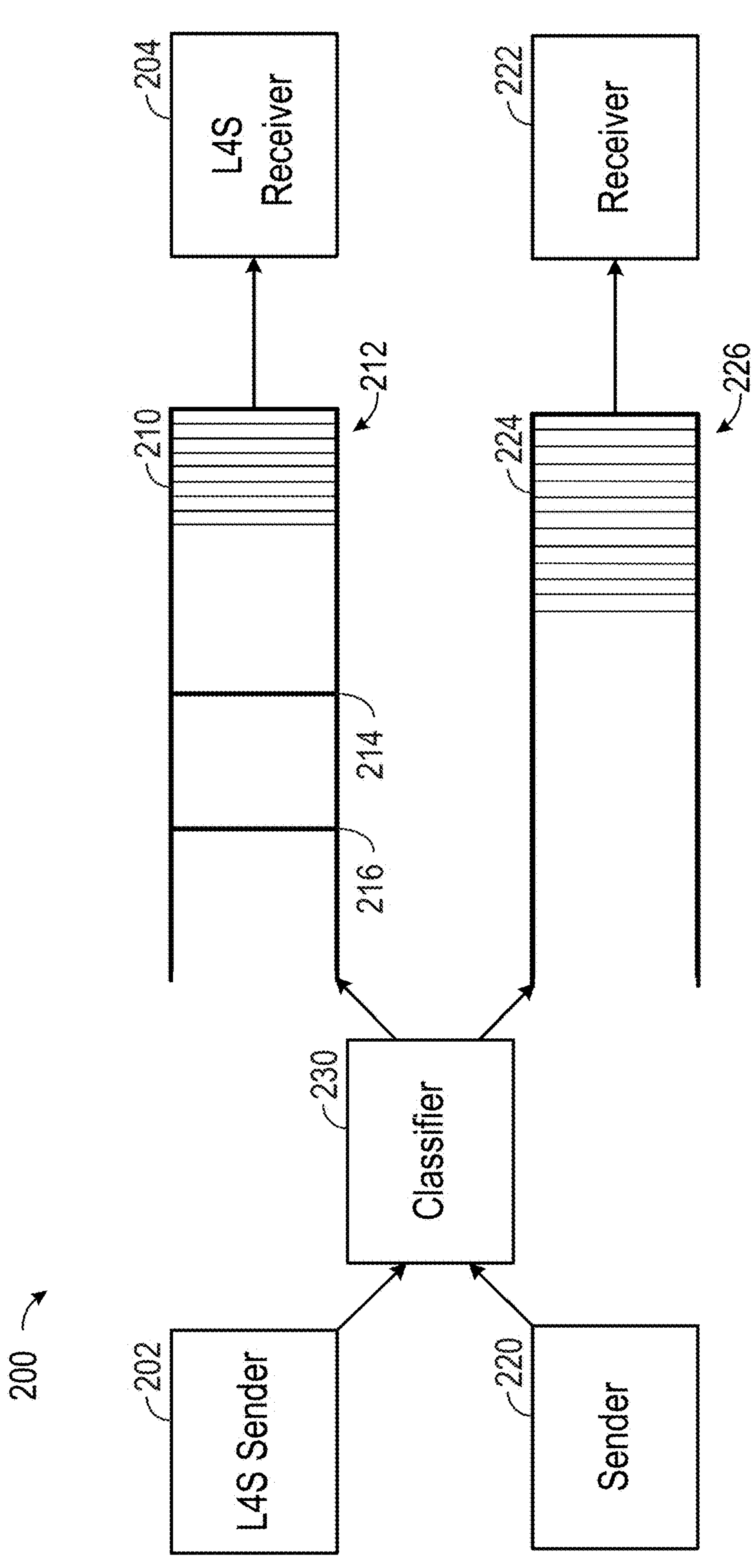
FIG. 2 is a block diagram of a L4S queuing system in accordance with aspects of the present disclosure.

FIG. 2 is a block diagram of a L4S queuing system 200. The L4S queuing system 200 includes a L4S sender 202, a L4S receiver 204, a L4S queue 210, a sender 220, a receiver 222, a classic queue 224, and a classifier 230. The L4S sender 202 can be a traffic source, such as a client 104 or a device of the network systems 106, sending latency sensitive traffic and therefore prioritized by L4S. The latency sensitive traffic can include traffic associated with video conferencing, online gaming, virtual reality, alternate realty, streaming, and/or the like. The L4S receiver 204 can be a destination for latency sensitive traffic, such as a client 104 or a device of the network systems 106. The L4S queue 210 is a queue for managing latency sensitive traffic 212 from traffic sources. The L4S queue 210 may be a shallow queue in some embodiments. There can be more than one L4S sender 202 adding traffic to the L4S queue 210 and/or more than one L4S receiver 204 in certain embodiments. Thus, the L4S queue 210 can manage traffic for multiple L4S senders 202. Additionally, there may be multiple L4S queues 210. For example, there may be an L4S queue 210 for each link.

The sender 220 can be a traffic source, such as a client 104 or a device of the network systems 106, sending traffic that may not be latency sensitive. The receiver 222 may be the destination of traffic from the sender 220, such as a client 104 or a device of the network systems 106. The classic queue 224 may be a queue for traffic 226 that may not be latency sensitive. There can be more than one sender 220 adding traffic to the classic queue 224 and/or more than one receiver 222 in some embodiments. In some example implementations, devices can be both L4S senders 202 and senders 220 and/or both L4S receivers 204 and receivers 222, and even simultaneously sending and receiving, based on the types of traffic the device is sending.

The classifier 230 may classify the types of traffic and sort latency sensitive traffic 212 into the L4S queue 210 and traffic 226 into the classic queue 224. The classifier 230 may sort the traffic based on the device, the device user (e.g., premium customer vs. non-premium customer), traffic type (e.g., latency sensitive traffic vs. non-latency sensitive traffic, traffic priority), and/or the like.

To implement improved L4S, the traffic scheduler 110 and/or some other network device configures the L4S queue 210 with multiple thresholds. The thresholds can be set for an amount of latency sensitive traffic 212 in the L4S queue 210, for a percentage of available capacity of the L4S queue 210, a percentage of available capacity for an associated device (e.g., the AP 102), and/or the like. The thresholds may vary between different L4S queues 210, for example based on the capacity of the L4S queues 210, the capacity of the associated device, expected clients, and/or the like. In the illustrated example, the L4S queue 210 includes a first threshold 214 and a second threshold 216. The first threshold 214 is set to be reached by the queued latency sensitive traffic 212 before the second threshold 216. The L4S queue 210 can have additional thresholds in other embodiments.

Once the traffic scheduler 110 detects the latency sensitive traffic 212 queued in the L4S queue 210 crosses above the first threshold 214, the traffic scheduler 110 may assign the L4S queue 210, and therefore the latency sensitive traffic 212 in the L4S queue 210, a higher priority. For example, the higher priority may be may be assigned so the latency sensitive traffic 212 has priority over traffic in other queues (e.g., the traffic 226 of the classic queue 224) and/or other traffic types. The traffic scheduler 110 can withhold sending congestion notifications with the intention to reduce the size of the latency sensitive traffic 212 in the L4S queue 210 more quickly by assigning the higher priority.

The congestion notifications may comprise sending an ECN mark in certain embodiments. The ECN mark can use two or more bits in a packet header to indicate the status of the L4S queue 210. For example, ECN bits set to 00 indicates that the traffic is not ECN-capable, 01 indicates that the traffic is ECN-capable (0), 10 indicates that the traffic is ECN-capable (1), and 11 indicates that there is congestion. Thus, the ECN bits may be set to 11 when the second threshold 216 is reached. When a traffic source receives a packet with ECN bits set to 11, the traffic source can alter operation, such as to reduce transmission speed, pause or cancel transmissions, and/or the like. In some embodiments, the traffic scheduler 110 may increase the priority of the L4S queue 210 by setting a shortened wait period for transmitting traffic, for example using Arbitration Interframe Spacing (AIFS) (e.g., changing the AIFS Number (AIFSN)) and/or altering the Contention Window minimum ($CW_{Min}$), to expedite the transmission of latency sensitive traffic 212 in the L4S queue 210.

If the size of the L4S queue 210 remains above the first threshold 214 but below the second threshold 216, the traffic scheduler 110 can maintain the higher priority to the L4S queue 210 without sending a congestion notification, such as marking ECN. If the size of the L4S queue 210 reduces and falls below the first threshold 214, the traffic scheduler 110 can instruct or otherwise cause the L4S queue 210 to return to normal operation. If size of the L4S queue 210 further increases and crosses above or reaches the second threshold 216, then the traffic scheduler 110 and/or the AP 102 can send a congestion notification (e.g., ECN marking) to communicate back to the traffic source (e.g., the L4S sender 202) about the congestion and decrease the traffic rate.

Figure 3:
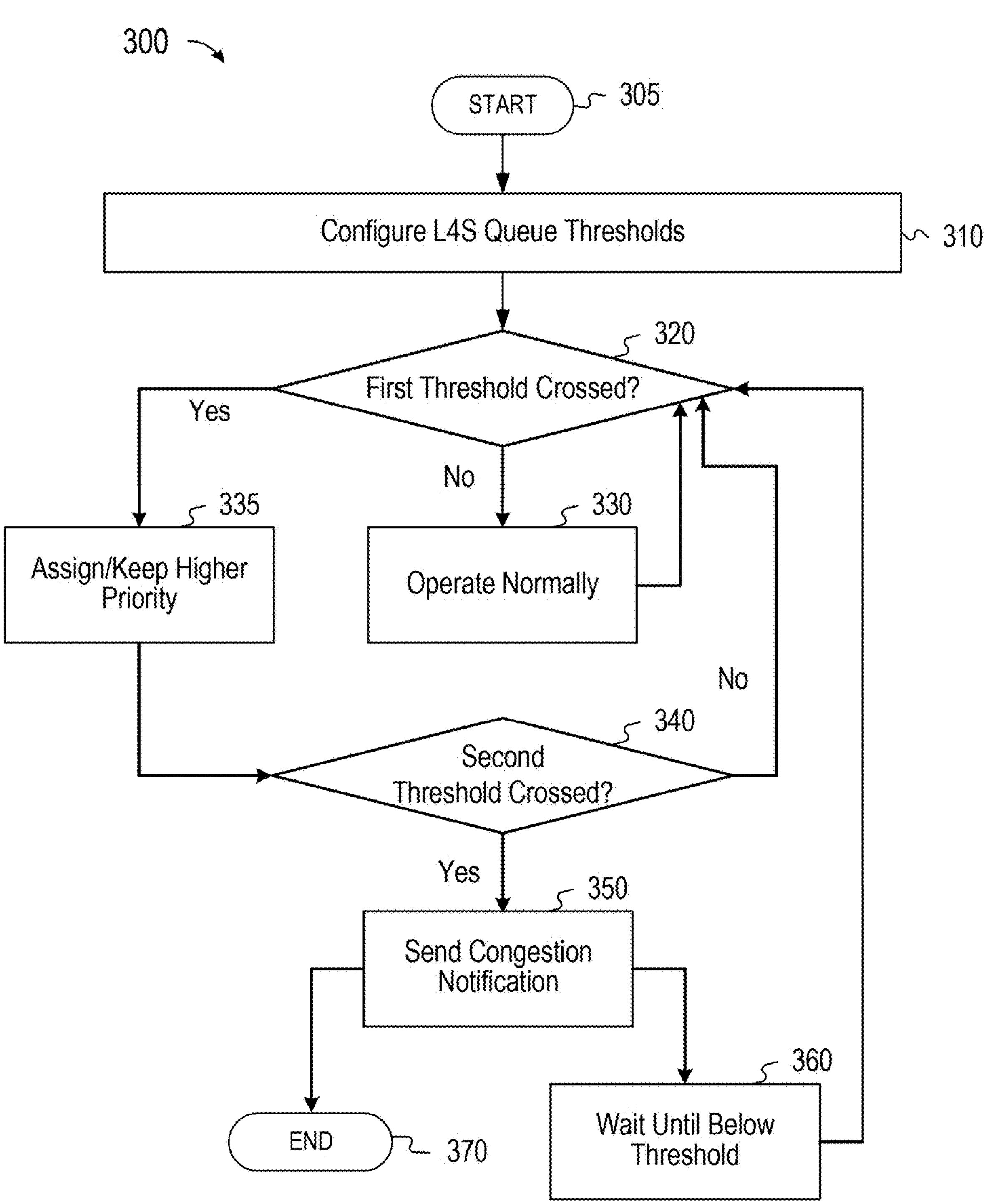
FIG. 3 is a flow chart of a method for L4S queuing in accordance with aspects of the present disclosure.

FIG. 3 is a flow chart of a method 300 for L4S queuing. The method 300 may begin at starting block 305 and proceed to operation 310. In operation 310, L4S queue thresholds are configured. For example, the traffic scheduler 110 configures the first threshold 214 and the second threshold 216, including for example setting the placement of the thresholds (e.g., the first threshold 214 at seventy-five percent of the L4S queue 210 depth and the second threshold 216 at ninety-percent of the L4S queue 210 depth).

In decision 320, it is determined whether the first threshold is crossed. For example, the traffic scheduler 110 determines whether the latency sensitive traffic 212 crosses above the first threshold 214. If the traffic scheduler 110 determines the first threshold 214 has not been crossed or has crossed back below the first threshold 214, the method 300 proceeds to operation 330. In operation 330, the traffic scheduler 110 can cause the L4S queue 210 to operate normally or do nothing if the L4S queue 210 is already operating normally. Normal operation can comprise a normal priority and otherwise normal operation characteristics for the L4S queue 210. The method 300 may proceed from operation 330 back to decision 320 so the traffic scheduler 110 can continue to monitor the L4S queue 210 and identify when the first threshold 214 is crossed.

If the traffic scheduler 110 determines the first threshold 214 is crossed in decision 320, the method 300 can proceed to operation 335. In operation 335, a higher priority is assigned or kept. For example, the traffic scheduler 110 assigns a higher priority to the L4S queue 210 or maintains the higher priority when the L4S queue 210 is already at the higher priority. The higher priority can enable the L4S queue 210 to clear the latency sensitive traffic 212 faster than it would during normal operation. For example, the traffic scheduler 210 can use AIFS and/or alter the $CW_{Min}$.

In decision 340, it is determined whether the second threshold is crossed. For example, the traffic scheduler 110 determines whether the latency sensitive traffic 212 crosses above the second threshold 216. If the traffic scheduler 110 determines the second threshold 216 is not crossed, the method 300 can proceed back to decision 320 for the traffic scheduler 110 to continue the evaluation of the L4S queue 210 (e.g., determine if the latency sensitive traffic 212 stays above the first threshold 214 or crosses below the first threshold 214). In some examples, the traffic scheduler 110 may delay for a period to allow the L4S queue 210 to attempt to clear traffic before the reevaluation.

If the traffic scheduler 110 determines the second threshold 216 is crossed in decision 340, the method 300 can proceed to operation 350. In operation 350, a congestion notification is sent. For example, the traffic scheduler 110 can send a congestion notification to the L4S sender 202 and/or the sender 220. The congestion notification can comprise ECN marking in some embodiments. After operation 350, the method 300 can proceed to operation 360, and the traffic scheduler 110 waits until the latency sensitive traffic 212 crosses below a threshold. In some embodiments, the traffic scheduler 110 waits until the L4S queue 210 crosses below the second threshold 216. In other embodiments, the traffic scheduler 110 waits until the L4S queue 210 crosses below the first threshold 214. In yet further embodiments, the method 300 may proceed directly back to decision 320 or decision 340. After operation 360, the method 300 can proceed back to decision 320 for the traffic scheduler 110 to continue monitoring the L4S queue 210. In some embodiments, the method 300 may proceed to decision 340 instead. Alternatively, the method 300 can conclude at ending block 370.

Figure 4:
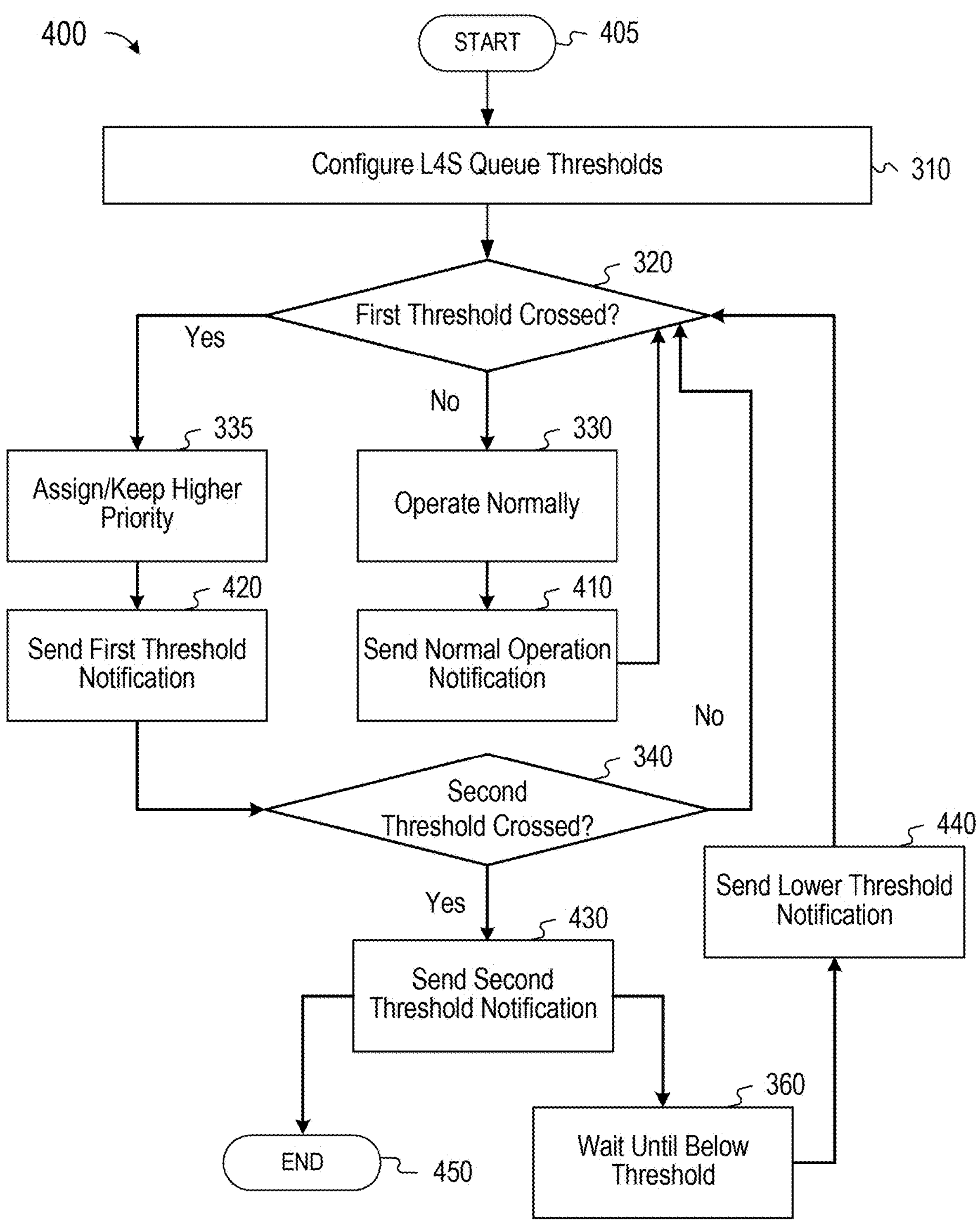
FIG. 4 is a flow chart of a method for hybrid L4S queuing in accordance with aspects of the present disclosure.

FIG. 4 is a flow chart of a method 400 for hybrid L4S queuing. In certain embodiments, the traffic scheduler 110 may utilize a hybrid notification L4S approach, such as the method 400. In the hybrid notification approach, the traffic scheduler 110 can send congestion notifications with different criteria based on the current threshold(s) that the latency sensitive traffic 212 has crossed above in the L4S queue 210. The method 400 may include operations of the method 300 and incorporate additional operations for sending further congestion notifications that identify the current threshold level and how to operate at the different threshold levels.

The method 400 may begin at starting block 405. The method 400 then proceeds to operation 310, and the traffic scheduler 110 configures the L4S queue 210 thresholds, such as the first threshold 214 and the second threshold 216. The method 400 then proceeds to decision 320 for the traffic scheduler 110 to determine whether the latency sensitive traffic 212 has crossed above the first threshold 214. If the traffic scheduler 110 determines the first threshold 214 has not been crossed or the latency sensitive traffic 212 has crossed below the first threshold 214, the method 400 proceeds to operation 330. In operation 330, the traffic scheduler 110 can cause the L4S queue 210 to operate normally or do nothing if the L4S queue 210 is already operating normally. In operation 410, a normal operation notification is sent. For example, the traffic scheduler 110 sends a normal operation notification to the L4S sender 202 and/or the sender 220. The normal operation notification can notify the receiving sender device(s) (e.g., L4S sender 202, the sender 220) that the L4S queue 210 is operating normally and no alteration to the operation of the sender device(s) is required. If the L4S queue 210 was already operating normally when operation 330 is reached, the traffic scheduler 110 may not send the normal operation notification because the sender device(s) should already be aware that the L4S queue 210 is operating normally. The method 400 may proceed from operation 410 back to decision 320 so the traffic scheduler 110 can continue to monitor the L4S queue 210 and identify when the first threshold 214 is crossed.

If the traffic scheduler 110 determines the first threshold 214 is crossed in decision 320, the method 400 can proceed to operation 335. In operation 335, the traffic scheduler 110 assigns a higher priority to the L4S queue 210 or maintains the higher priority when the L4S queue 210 is already at the higher priority. In operation 420, a first threshold notification is sent. For example, the traffic scheduler 110 sends a first threshold notification to the sender device(s). If the higher priority was already set in operation 335, the traffic scheduler 110 may skip sending the first threshold notification in some example implementations.

The first threshold notification can notify the sender device(s) that the latency sensitive traffic 212 has crossed above the first threshold 214 and to alter operation to address the L4S queue 210 crossing above the first threshold 214. The sender device(s) may alter operation to a lower degree than a typical congestion notification, such as a notification sent after the second threshold 216 is crossed above. For example, the transmission rate may be lowered but lowered less than the transmission rate would be lowered when the second threshold 216 is crossed above. The first threshold notification may comprise an ECN marking that identifies the first threshold 214 as crossed. In some examples, the ECN marking may comprise more than two bits to indicate that latency sensitive traffic 212 crossed above the first threshold 214 (e.g., bits set to 110 to indicate the first threshold 214 is crossed above).

In decision 340, the traffic scheduler 110 determines whether the latency sensitive traffic 212 has crossed above the second threshold 216. If the traffic scheduler 110 determines the second threshold 216 is not crossed above, the method 400 can proceed back to decision 320 for the traffic scheduler 110 to continue the evaluation of the L4S queue 210 (e.g., to determine if the latency sensitive traffic 212 remains above the first threshold 214 or crosses below the first threshold 214). In some examples, the traffic scheduler 110 may delay for a period to allow the L4S queue 210 to attempt to clear traffic before the reevaluation.

If the traffic scheduler 110 determines the second threshold 216 is crossed in decision 340, the method 400 can proceed to operation 430, and a second threshold notification is sent. For example, the traffic scheduler 110 can send a second threshold notification to the sender device(s) indicating that the latency sensitive traffic 212 crossed above the second threshold 216 for the sender device(s) to alter operation accordingly. The second threshold notification may comprise an ECN mark that identifies the second threshold 216 as being crossed above. For example, the ECN mark may comprise more than two bits to indicate that the latency sensitive traffic 212 crossed above the second threshold 216 (e.g., bits set to 111 to indicate the second threshold 216 is crossed). In response to the second threshold notification, the sender device(s) may further decrease transmission rates from the decrease previously performed in response to the first threshold notification, pause transmissions, cancel transmissions, and/or the like.

After operation 430, the method 400 can proceed to operation 360, and the traffic scheduler 110 can wait until the latency sensitive traffic 212 is below a threshold. In some embodiments, the traffic scheduler 110 waits until the L4S queue 210 crosses below the second threshold 216. In other embodiments, the traffic scheduler 110 waits until the L4S queue 210 crosses below the first threshold 214. In yet further embodiments, the method 400 may proceed directly back to decision 320 or decision 340. After operation 360, the method 400 can proceed to operation 440, and a lower threshold notification can be sent to indicate which thresholds the latency sensitive traffic 212 has crossed below. For example, if the traffic scheduler 110 waits until the L4S queue 210 goes below the second threshold 216, the traffic scheduler 110 sends a first threshold notification. If the traffic scheduler 110 waits until the L4S queue 210 goes below the first threshold 214, the traffic scheduler 110 sends a normal operation notification. The method 400 can then proceed back to decision 320 for the traffic scheduler 110 to continue monitoring the L4S queue 210. In some embodiments, the method 400 may proceed to decision 340 instead. Alternatively, the method 400 can conclude at ending block 450.

Figure 5:
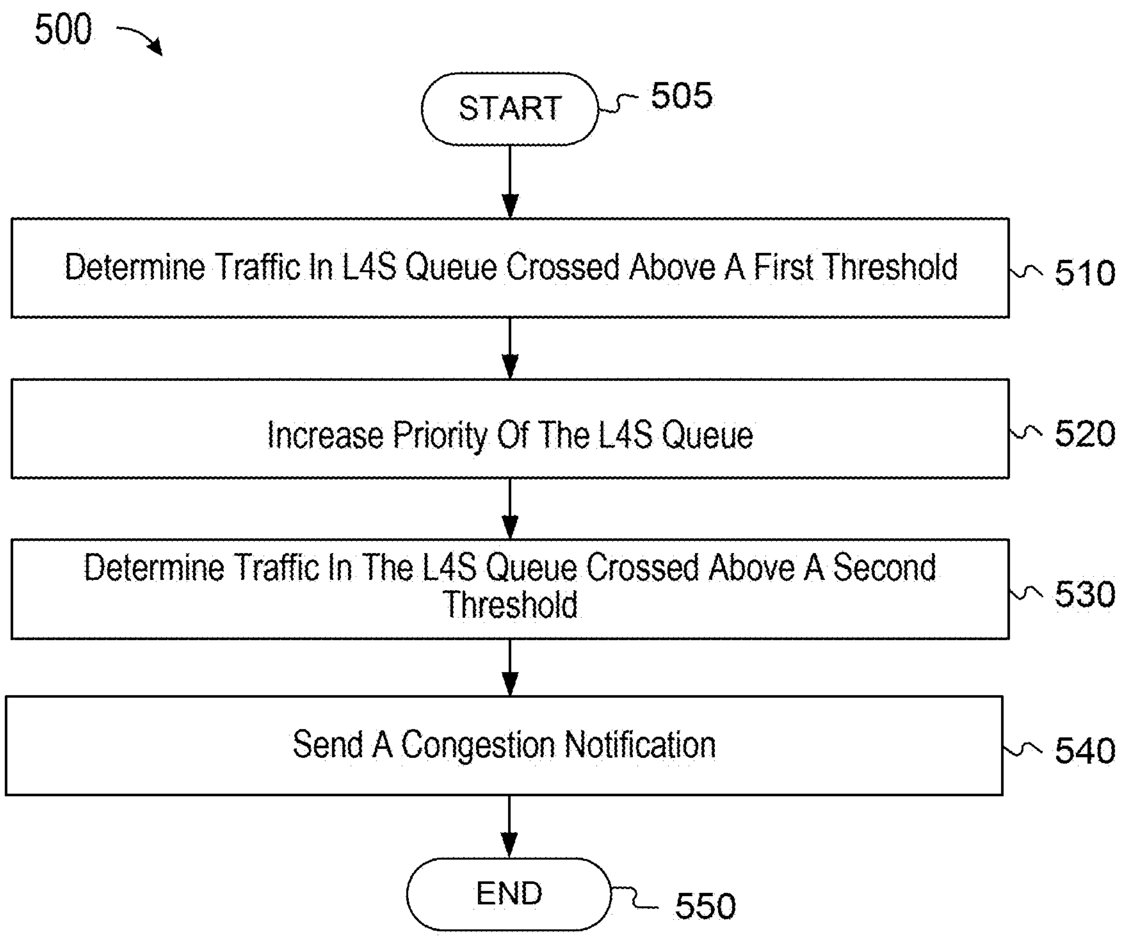
FIG. 5 is a flow chart of a method for L4S latency improvements in accordance with aspects of the present disclosure.

FIG. 5 is a flow chart of a method 500 for L4S latency improvements in accordance with aspects of the present disclosure. The method 500 may include any the operations and decisions of the method 300 and/or the method 400. For example, while the method 500 may linearly in the illustrated example, the method 500 may incorporate the decision steps to determine which operation to proceed to as different thresholds are crossed above and below.

The method 500 may begin at starting block 505 and proceed to operation 510. In operation 510, determining traffic in a L4S queue has crossed above a first threshold. For example, the traffic scheduler 110 determines the latency sensitive traffic 212 has crossed above the first threshold 214.

In operation 520, a priority of the L4S is increased. For example, in response to determining the latency sensitive traffic 212 in the L4S queue 210 has crossed above the first threshold 214, the traffic scheduler 110 increases a priority of the L4S queue. Increasing the priority can include using AIFS and/or altering the $CW_{Min}$.

In operation 530, it is determined that the traffic in the L4S queue has crossed above a second threshold. For example, the traffic scheduler 110 determines the latency sensitive traffic 212 in the L4S queue 210 has crossed above the second threshold 216.

In operation 540, a congestion notification is sent. For example, in response to determining the latency sensitive traffic 212 in the L4S queue 210 has crossed above the second threshold 216, the traffic scheduler 110 sends a congestion notification to sender device(s), such as the L4S sender 202 and/or the sender 220. The congestion notification comprises an ECN mark in some embodiments.

The method 500 can include configuring the first threshold and the second threshold to given levels of the L4S queue, such as the traffic scheduler 110 setting the first threshold 214 and the second threshold 216. In some embodiments, the method 500 further comprises sending a first threshold notification in response to determining the traffic in the L4S queue has crossed above the first threshold, wherein the congestion notification is a second threshold notification. The method 500 can include determining the traffic in the L4S queue has crossed below the first threshold and, in response to determining the traffic of the L4S queue has crossed below the first threshold, decreasing the priority of the L4S queue in certain embodiments. In some embodiments, the method 500 can comprise determining the traffic of the L4S queue has crossed below any one of (i) the first threshold 214, (ii) the second threshold 216, or (iii) both (i) and (ii), and, in response, sending a lower threshold notification. The method 500 can conclude at ending block 550.

Figure 6:
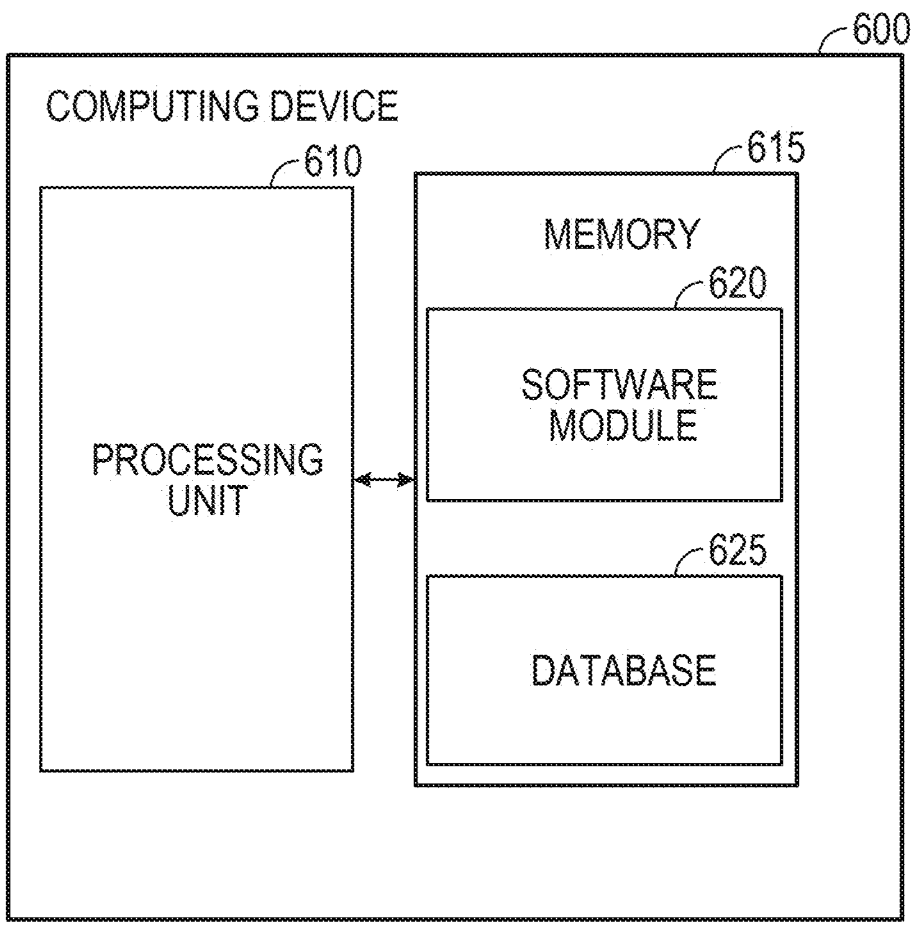
FIG. 6 is a block diagram of a computing device in accordance with aspects of the present disclosure.

FIG. 6 is a block diagram of a computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for L4S latency improvement with respect to FIG. 1, FIG. 2, FIG. 3, FIG. 4, and FIG. 5. Computing device 600, for example, may provide an operating environment for the AP 102, the clients 104, the network systems 106, the traffic scheduler 110, the L4S sender 202, the L4S receiver 204, the L4S queue 210, the sender 220, the receiver 222, the classic queue 224, and the like. The AP 102, the clients 104, the network systems 106, the traffic scheduler 110, the L4S sender 202, the L4S receiver 204, the L4S queue 210, the sender 220, the receiver 222, the classic queue 224, and the like may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Figure 7:
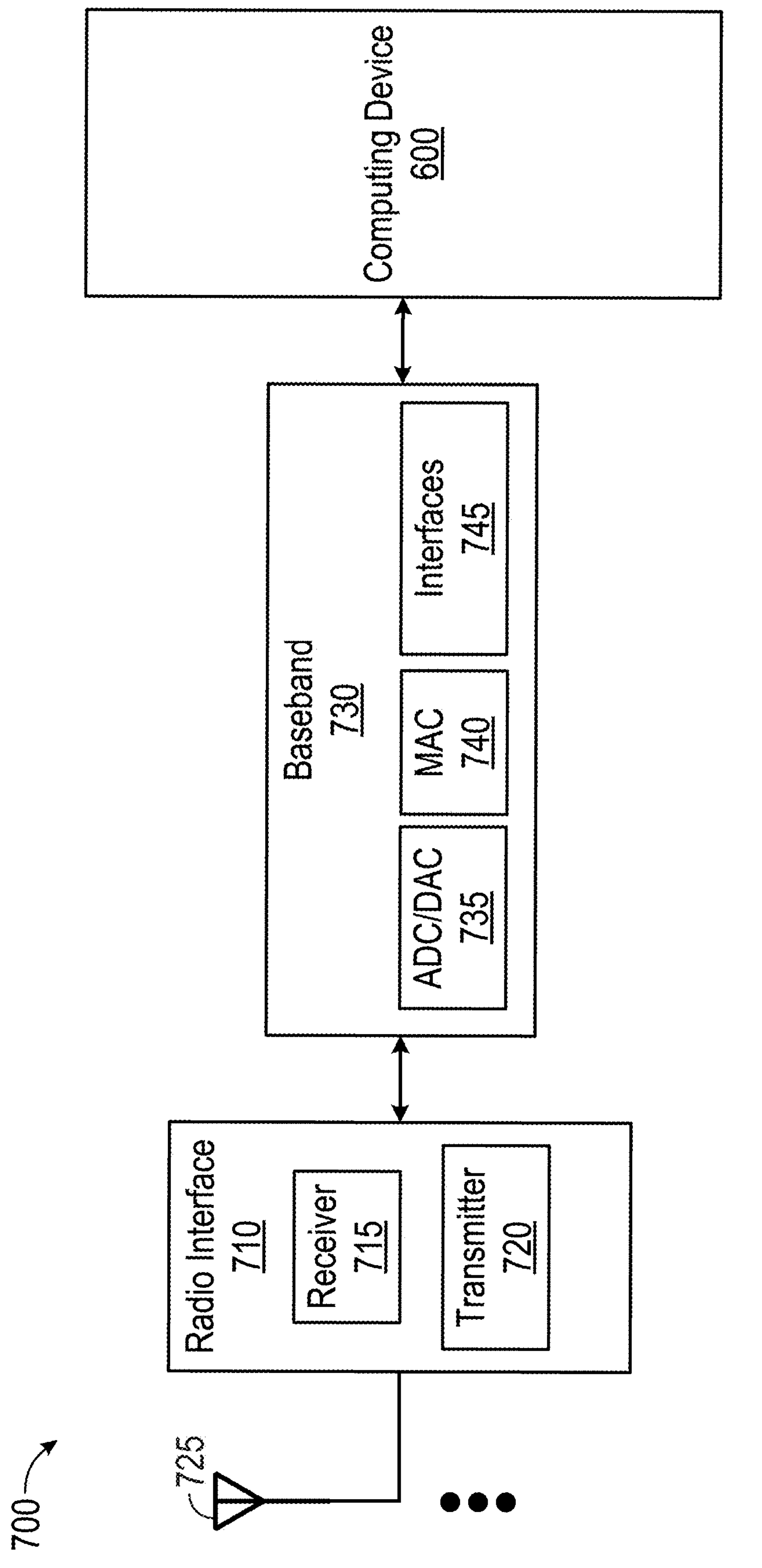
FIG. 7 is a block diagram of a wireless device in accordance with aspects of the present disclosure.

FIG. 7 illustrates an implementation of a communications device 700 that may implement one or more of the AP 102, the clients 104, the network systems 106, the traffic scheduler 110, the L4S sender 202, the L4S receiver 204, the L4S queue 210, the sender 220, the receiver 222, the classic queue 224, controllers, etc., of FIGS. 1-5. In various implementations, the communications device 700 may comprise a logic circuit. The logic circuit may include physical circuits to perform operations described for one or more of the AP 102, the clients 104, the network systems 106, the traffic scheduler 110, the L4S sender 202, the L4S receiver 204, the L4S queue 210, the sender 220, the receiver 222, the classic queue 224, controllers, etc., of FIGS. 1-4, for example. As shown in FIG. 7, the communications device 700 may include one or more of, but is not limited to, a radio interface 710, baseband circuitry 730, and/or the computing device 600.

The communications device 700 may implement some or all of the structures and/or operations for the AP 102, the clients 104, the network systems 106, the traffic scheduler 110, the L4S sender 202, the L4S receiver 204, the L4S queue 210, the sender 220, the receiver 222, the classic queue 224, controllers, controllers, etc., of FIGS. 1-5, storage medium, and logic circuit in a single computing entity, such as entirely within a single device. Alternatively, the communications device 700 may distribute portions of the structure and/or operations using a distributed system architecture, such as a client station server architecture, a peer-to-peer architecture, a master-slave architecture, etc.

A radio interface 710, which may also include an Analog Front End (AFE), may include a component or combination of components adapted for transmitting and/or receiving single-carrier or multi-carrier modulated signals (e.g., including Complementary Code Keying (CCK), Orthogonal Frequency Division Multiplexing (OFDM), and/or Single-Carrier Frequency Division Multiple Access (SC-FDMA) symbols), although the configurations are not limited to any specific interface or modulation scheme. The radio interface 710 may include, for example, a receiver 715 and/or a transmitter 720. The radio interface 710 may include bias controls, a crystal oscillator, and/or one or more antennas 725. In additional or alternative configurations, the radio interface 710 may use oscillators and/or one or more filters, as desired.

The baseband circuitry 730 may communicate with the radio interface 710 to process, receive, and/or transmit signals and may include, for example, an Analog-To-Digital Converter (ADC) for down converting received signals with a Digital-To-Analog Converter (DAC) 735 for up converting signals for transmission. Further, the baseband circuitry 730 may include a baseband or PHYsical layer (PHY) processing circuit for the PHY link layer processing of respective receive/transmit signals. Baseband circuitry 730 may include, for example, a Media Access Control (MAC) processing circuit 740 for MAC/data link layer processing. Baseband circuitry 730 may include a memory controller for communicating with MAC processing circuit 740 and/or a computing device 600, for example, via one or more interfaces 745.

In some configurations, PHY processing circuit may include a frame construction and/or detection module, in combination with additional circuitry such as a buffer memory, to construct and/or deconstruct communication frames. Alternatively or in addition, MAC processing circuit 740 may share processing for certain of these functions or perform these processes independent of PHY processing circuit. In some configurations, MAC and PHY processing may be integrated into a single circuit.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:

determining traffic in a Low Latency, Low Loss, Scalable Throughput (L4S) queue has crossed above a first threshold of two or more thresholds configured for the L4S queue, wherein each of the two or more thresholds are set for an amount of traffic in the L4S queue;

in response to determining the traffic in the L4S queue has crossed above the first threshold, increasing a priority of the L4S queue such that the L4S queue has priority over traffic in other queues;

determining the traffic in the L4S queue has crossed above a second threshold subsequent to crossing the first threshold, wherein the first threshold is set to be reached by the traffic in the L4S queue before the second threshold of the two or more thresholds; and in response to determining the traffic in the L4S queue has crossed above the second threshold, sending a congestion notification.

2. The method of claim 1, further comprising configuring the first threshold and the second threshold to given levels of the L4S queue.

3. The method of claim 1, wherein the congestion notification comprises an Explicit Congestion Notification (ECN) mark.

4. The method of claim 1, further comprising sending a first threshold notification in response to determining the traffic in the L4S queue has crossed above the first threshold, wherein the congestion notification is a second threshold notification.

5. The method of claim 1, further comprising:

determining the traffic in the L4S queue has crossed below the first threshold; and in response to determining the traffic of the L4S queue has crossed below the first threshold, decreasing the priority of the L4S queue.

6. The method of claim 1, wherein increasing the priority of the L4S queue comprises any one of (i) using Arbitration Interframe Spacing, (ii) altering a Contention Window minimum ($CW_{Min}$), or (iii) a combination of (i) and (ii).

7. The method of claim 1, further comprising:

determining the traffic of the L4S queue has crossed below any one of (i) the first threshold, (ii) the second threshold, or (iii) both (i) and (ii); and in response, sending a lower threshold notification.

8. A system comprising:

a memory storage; and a processing unit coupled to the memory storage, wherein the processing unit is operative to:

determine traffic in a Low Latency, Low Loss, Scalable Throughput (L4S) queue has crossed above a first threshold of two or more thresholds configured for the L4S queue, wherein each of the two or more thresholds are set for an amount of traffic in the L4S queue;

in response to determining the traffic in the L4S queue has crossed above the first threshold, increase a priority of the L4S queue such that the L4S queue has priority over traffic in other queues;

determine the traffic in the L4S queue has crossed above a second threshold subsequent to crossing the first threshold, wherein the first threshold is set to be reached by the traffic in the LAS queue before the second threshold of the two or more thresholds; and in response to determining the traffic in the L4S queue has crossed above the second threshold, send a congestion notification.

9. The system of claim 8, the processing unit being further operative to configure the first threshold and the second threshold to given levels of the L4S queue.

10. The system of claim 8, wherein the congestion notification comprises an Explicit Congestion Notification (ECN) mark.

11. The system of claim 8, the processing unit being further operative to send a first threshold notification in response to determining the traffic in the L4S queue has crossed above the first threshold, wherein the congestion notification is a second threshold notification.

12. The system of claim 8, the processing unit being further operative to:

determine the traffic in the L4S queue has crossed below the first threshold; and in response to determining the traffic of the L4S queue has crossed below the first threshold, decrease the priority of the L4S queue.

13. The system of claim 8, wherein increasing the priority of the L4S queue comprises any one of (i) using Arbitration Interframe Spacing, (ii) altering a Contention Window minimum ($CW_{Min}$), or (iii) a combination of (i) and (ii).

14. The system of claim 8, the processing unit being further operative to:

determine the traffic of the L4S queue has crossed below any one of (i) the first threshold, (ii) the second threshold, or (iii) both (i) and (ii); and in response, send a lower threshold notification.

15. A non-transitory computer-readable medium that stores a set of instructions which when executed perform a method executed by the set of instructions comprising:

determining traffic in a Low Latency, Low Loss, Scalable Throughput (L4S) queue has crossed above a first threshold of two or more thresholds configured for the L4S queue, wherein each of the two or more thresholds are set for an amount of traffic in the L4S queue;

in response to determining the traffic in the L4S queue has crossed above the first threshold, increasing a priority of the L4S queue such that the L4S queue has priority over traffic in other queues;

determining the traffic in the L4S queue has crossed above a second threshold subsequent to crossing the first threshold, wherein the first threshold is set to be reached by the traffic in the L4S queue before the second threshold of the two or more thresholds; and in response to determining the traffic in the L4S queue has crossed above the second threshold, sending a congestion notification.

16. The non-transitory computer-readable medium of claim 15, the method executed by the set of instructions further comprising configuring the first threshold and the second threshold to given levels of the L4S queue.

17. The non-transitory computer-readable medium of claim 15, wherein the congestion notification comprises an Explicit Congestion Notification (ECN) mark.

18. The non-transitory computer-readable medium of claim 15, the method executed by the set of instructions further comprising sending a first threshold notification in response to determining the traffic in the L4S queue has crossed above the first threshold, wherein the congestion notification is a second threshold notification.

19. The non-transitory computer-readable medium of claim 15, the method executed by the set of instructions further comprising:

determining the traffic in the L4S queue has crossed below the first threshold; and in response to determining the traffic of the L4S queue has crossed below the first threshold, decreasing the priority of the L4S queue.

20. The non-transitory computer-readable medium of claim 15, the method executed by the set of instructions further comprising:

determining the traffic of the L4S queue has crossed below any one of (i) the first threshold, (ii) the second threshold, or (iii) both (i) and (ii); and in response, sending a lower threshold notification.

* * * * *